US008872650B2

(12) United States Patent
King et al.

(10) Patent No.: US 8,872,650 B2
(45) Date of Patent: Oct. 28, 2014

(54) EQUIPMENT MAINTENANCE AND MONITORING FOR CONTAINER YARDS (75) Inventors: Henry King, Moraga, CA (US); Toru Takehara, Hayward, CA (US)

(73) Assignee: HKI Systems and Service, LLC, Hayward, CA (US)

( * ) Notice: Subject to any disclaimer, the term of this patent is extended or adjusted under 35 U.S.C. 154(b) by 592 days.

(21) Appl. No.: 13/181,353

(22) Filed: Jul. 12, 2011

(65) Prior Publication Data

US 2011/0270488 A1 Nov. 3, 2011

Related U.S. Application Data (63) Continuation-in-part of application No. 12/748,364, filed on Mar. 26, 2010, now abandoned, and a continuation-in-part of application No. 12/574,624, filed on Oct. 6, 2009, now Pat. No. 8,188,865, which is a continuation of application No. 11/130,822, filed on May 16, 2005, now Pat. No. 7,598,863.

(60) Provisional application No. 61/163,849, filed on Mar. 26, 2009, provisional application No. 60/571,009, filed on May 14, 2004.

(51) Int. Cl.
G08B 1/08 (2006.01)

(52) U.S. Cl.
USPC .............. 340/539.1; 340/539.13; 340/539.16; 340/3.44; 235/375; 235/381; 701/33

(58) Field of Classification Search
USPC .............. 340/539.1, 539.13, 539.16, 539.19, 340/572.1, 825.49, 825.69, 825.72, 3.44, 340/824.69; 235/375, 381, 382, 383, 385; 701/1, 24, 29.4, 36, 48, 49, 207, 208, 701/29, 33; 705/22, 28, 35
See application file for complete search history.

(56) References Cited

U.S. PATENT DOCUMENTS

| | | | | |
|---|---|---|---|---|
| 5,780,826 A | * | 7/1998 | Hareyama et al. | 235/385 |
| 6,067,009 A | * | 5/2000 | Hozuka et al. | 340/459 |
| 6,694,248 B2 | * | 2/2004 | Smith et al. | 701/117 |
| 6,768,931 B2 | * | 7/2004 | Takehara et al. | 700/225 |
| 6,941,202 B2 | * | 9/2005 | Wilson et al. | 701/31.5 |
| 7,194,330 B2 | * | 3/2007 | Carson | 700/214 |
| 7,236,862 B2 | * | 6/2007 | Kanno | 701/31.5 |
| 7,549,153 B2 | * | 6/2009 | Butterworth et al. | 719/317 |
| 7,778,750 B2 | * | 8/2010 | Knight et al. | 701/31.5 |
| 8,200,823 B1 | * | 6/2012 | Zhang et al. | 709/226 |
| 2004/0093291 A1 | * | 5/2004 | Bodin | 705/35 |
| 2004/0193466 A1 | * | 9/2004 | Kull et al. | 705/8 |

* cited by examiner

Primary Examiner — Hung T. Nguyen
(74) Attorney, Agent, or Firm — GSS Law Group (57) ABSTRACT A processor is disclosed that may be configured to receive a status report for a vehicle in a container yard and/or a status reporting device configured to monitor the vehicle. The processor may respond to the received status report by creating a system action request and/or a system log. The system action request may include a fault condition problem report and/or a maintenance schedule request for the vehicle and/or the status reporting device. The processor automates generating responses to the received status reports, providing a fundamental tool to reduce down time for vehicles and improve their support of container transfer operations in the container yard. The system action request, system log and/or system action may be products of the processor's operation. A computer readable memory and/or a server may be configured to deliver a report, program system and/or an installation package to the end user.

20 Claims, 10 Drawing Sheets

Crane state list 314
- Twistlock sensed state 330
- Spreader sensed state 332
- Sensed landing state 334
- Trolley sensed position 336
- Hoist height 338

Fig. 18

Machine state list 312
- Reverse motion 350
- Frequent stops count 352
- Fuel level 354
- Compass reading 356
- Collision state 358
- Wind speed 360
- Vehicle speed 362
- Vehicle braking system state 364
- Engine coolant level 366
- Oil pressure 368
- Alternator voltage 370
- Battery voltage 372
- Headlight switch state 374
- Seatbelt engagement state 376
- Deisel particulate filter trap state 378
- Mileage 379

Fig. 19

Received status report 120

Equipment status report 380
- Optical characteristic system 382
- Power supply 384
- Means for wirelessly communicating 386
- Means for wirelessly determining location 388
- Status reporting device 12
- Vehicle 10
  - Engine 390
  - Hoist 392
  - Trolley 394

EQUIPMENT MAINTENANCE AND MONITORING FOR CONTAINER YARDS

CROSS REFERENCES TO PRIORITY DOCUMENTS

This application is a continuation in part of U.S. application Ser. No. 12/748,364 ('364) filed Mar. 26, 2010, abandoned, entitled "Equipment Maintenance and Monitoring Systems and Methods for Use in Shipping Terminals", which claims the benefit of US Provisional patent application Ser. No. 61/163,849, filed Mar. 26, 2009, and the '364 application is also a continuation in part of U.S. patent application Ser. No. 12/574,624 filed Oct. 6, 2009, issued on May 29, 2012 as U.S. Pat. No. 8,188,865, which is a continuation of U.S. patent application Ser. No. 11/130,822 filed May 16, 2005, issued on Oct. 6, 2009 as U.S. Pat. No. 7,598,863, which further claims the benefit of the priority date of provisional patent application Ser. No. 60/571,009 filed May 14, 2004, all of which are incorporated herein by reference in their entirety.

FIELD OF THE INVENTION

The present invention relates to systems and methods for monitoring equipment in a container yard.

BACKGROUND OF THE INVENTION

Container yards will refer to shipping terminals and/or container terminals that may be transfer points for containers between marine and/or land-based shipping of the containers. The containers come in five sizes ranging from twenty feet (20 FT) to fifty three feet (53 FT) long, and when filled, may weigh up to 110,000 pounds, or 50,000 kilograms, making them impossible to move, except by machinery referred to herein as container handlers.

Maintaining the container handlers and their status reporting devices can be a significant expense. As container yards are often required to run inventory systems for the entire terminal autonomously, being able to maintain equipment efficiently without disrupting production becomes increasingly important, creating a need to automatically monitor the inventory moved by these vehicles.

The need to automatically monitor the container handlers mechanical systems, and the state of the status reporting devices communicating what the container handler is doing is further fueled by the observation that overall container yard efficiency tends to improve with knowing the status and/or location of each container handler and of each container moved by that container handler.

Additionally, illicit use of the container handlers may be minimized by use of operator identification as part of the automatic monitoring.

BRIEF SUMMARY OF THE INVENTION

A processor is disclosed that may be configured to respond to a received status report for a vehicle in a container yard, and/or for a status reporting device configured to monitor the vehicle state of containers it is moving in the terminal. The processor may respond to the received status report by creating a system log and/or a system action request. The system action request may include a fault condition problem report and/or a maintenance schedule request for the vehicle and/or the status reporting device. The system action request may stimulate a system action performed on the vehicle and/or the status reporting device.

The processor automates generating of the responses to the received status reports, thereby providing a fundamental tool to reduce down time for the vehicles and improve their support of container transfer operations in the container yard.

The vehicle may be at least one member of a container handler list and/or a member of a non-container handler list. The container yard may a transfer point for at least one container moved by at least one of said members of said container handler list.

The processor may include means for communicating to create the received status report, means for processing the received status report to create the system action request and means for logging the received status report to maintain at least one system log. The processor and/or some or all of these means may include at least one instance of a finite state machine, an inferential engine, a computer an accessibly coupled memory include a program system configured to instruct the computer.

A computer readable memory and a server are also disclosed, both configured to communicate with the computer, which may be part of the maintenance monitoring system. The computer readable memory may include the program system and/or an installation package configured to instruct the computer to install the program system. The server may be configured to deliver the program system and/or the installation package to the computer. The server can also record log file data from the equipment installed and alert the user of maintenance events over a web interface or e-mail message protocol.

Fault events may be related to specific ways in which the vehicles and/or the status reporting devices may experience inefficiencies or obstacles to performing their tasks. For example, the fault event may include at least one member of an event list including an engine coolant event, an oil pressure event, an alternator voltage event, a battery voltage event, a headlight switch event, a seatbelt engagement event, a diesel particulate filter trap event, a collision event, an operator identity event and/or a container discrepancy event. Non-fault events can include engine hours elapsed for required maintenance, high fuel consumption events.

Events that may be critical to a correctly functioning, status reporting device for container movement, may also be reported. This may include reporting events in the handling of containers such as a twistlock event, a landed signal event, a container weight sensor reading, a container gain or loss sensor event, a fifth wheel latch/unlatch event, a spreader trolley position change event, a spreader hoist height position change event, an equipment reverse movement event, and/or a gantry or equipment movement event.

The processor may be further configured to receive the status report via a wireless transceiver and/or a removable memory device interface and/or a wireline network interface. The processor may further include the wireless transceiver and/or the removable memory device interface and/or the wireline network interface.

The processor may send the system action request to a maintenance dispatch node to at least partly create the system action. The request may be sent via the wireless transceiver and/or the removable memory device interface and the wireline network interface.

The received status report may include at least one instance of at least one member of a sensed state list including a sensed operator identity, a sensed container present, an optical characteristic, a container radio frequency tag, a container relative position or height, a member of a machine state list, a member of a crane state list, a container size, a container weight, a container damage estimate, an optical characteristic of a container, and a location of the vehicle and/or the container coupled to the vehicle.

The received status report may include at least one equipment status report for at least one of an optical characteristic system, a power supply, a means for wirelessly determining location, a means for wirelessly communicating, the status reporting device, an engine and/or a hoist and/or a trolley of the vehicle.

DESCRIPTION OF THE PREFERRED EMBODIMENTS

The present invention relates to systems and methods for monitoring equipment in a container yard. A processor is disclosed that may be configured to receive a status report for a vehicle in a container yard and/or a status reporting device configured to monitor the vehicle. The processor may respond to the received status report by creating a system action request and/or a system log.

Figure 1A:
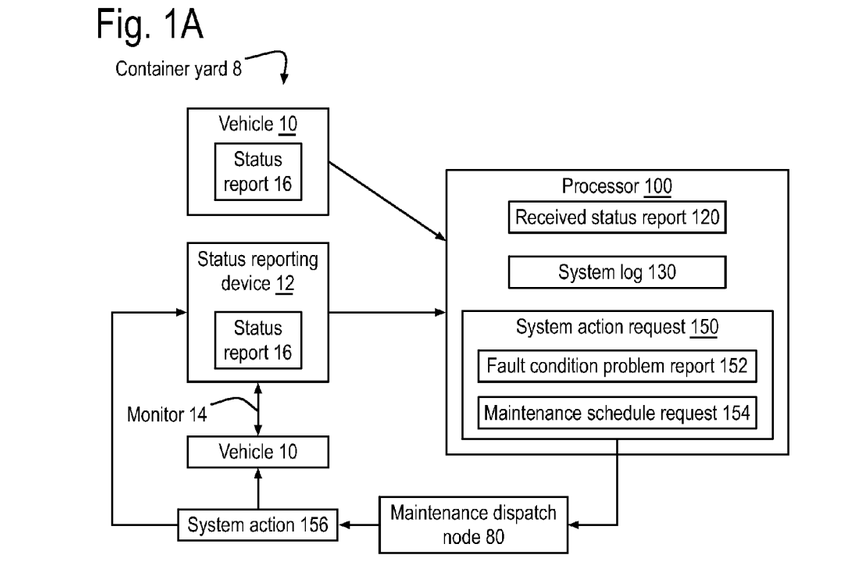
FIG. 1A shows an example block diagram of a processor that may be configured to respond to a received status report for a vehicle in a container yard and/or for a status reporting device configured to monitor the vehicle. The processor may respond to the received status report by creating a system action request and/or at least one system log.

Referring to the Figures more particularly by reference numbers, FIG. 1A shows an example block diagram of a processor 100 that may be configured to respond to a received status report 120 for a vehicle 10 in a container yard 8 and/or for a status reporting device 12 configured to monitor 14 the vehicle. The processor may respond to the received status report by creating a system action request 150 and/or at least one system log 130. The system action request may include a fault condition problem report 152 and/or a maintenance schedule request 154 for the vehicle and/or the status reporting device. The vehicle and/or the status reporting device may generate a local status report 16 that may be sent to the processor to create the received status report. The system action request may stimulate a system action 156 to be performed on the vehicle and/or the status reporting device, possibly by the system action request being sent to a maintenance dispatch node 80.

Figure 1B:
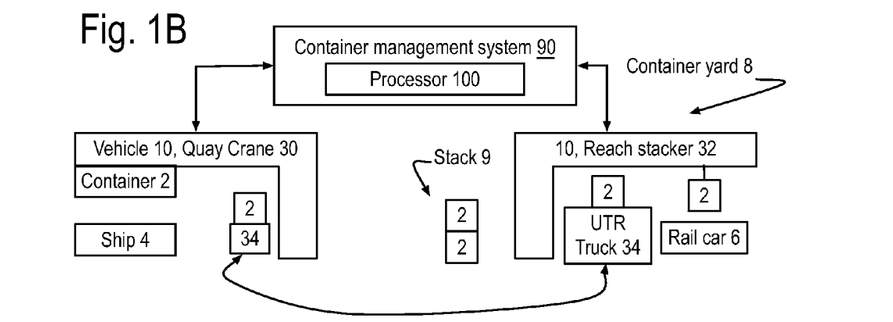
FIG. 1B shows a further example of the processor operating as part of a container management system for the container yard supporting container transfers between a ship, a stack of containers, and a rail car with several vehicles. A vehicle may be at least one member of a container handler list and/or a member of a non-container handler list.

The processor 100 automates generating of the responses 130, 150 and/or 156 to the received status reports 120, thereby providing a fundamental tool to reduce down time for the vehicles 10, and improve their support of the transfer of containers 2 in the container yards 8 as further shown in FIG. 1B.

FIG. 1B shows a further example of the processor 100 operating as part of a container management system 90 for the container yard 8 supporting container 2 transfers between a ship 4, a stack 9 of containers, and a rail car 6. There are several vehicles 10 in this Figure: A quay crane 30 may act as a vehicle 10 transferring containers to or from a UTR truck 34 and to or from the ship. The UTR truck may also transfer the container to the reach stacker 32, which may transfer the container to the stack 9 and/or to the rail car 6.

The vehicle 10 may be at least one member of a container handler list 18 and/or a member of a non-container handler list 16. The container yard 8 may a transfer point for at least one container 2 moved by at least one of said members of said container handler list.

Figure 2:
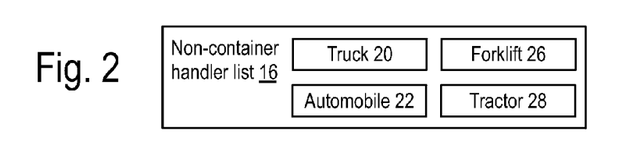
FIG. 2 shows the non-container handler list.

FIG. 2 shows the non-container handler list 16 may include a truck 20, an automobile 22, a forklift 26 and/or a tractor 28, which will not be shown in further detail, given that many people are familiar with their functions, structure and operations.

FIGS. 3A to 3G show some examples and/or details related to the container handlers for the container yard 8.

Figure 3A:
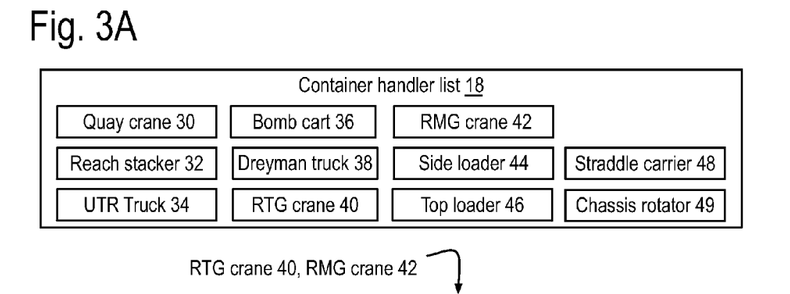
FIGS. 3A to 3G show some examples and/or details related to the container handlers for the container yard.

FIG. 3A shows the members of the container handler list 18 that may include the quay crane 30, the reach-stacker 32, an UTR truck 34, a bomb cart 36, a drayman truck 38, a Rubber Tire Gantry (RTG) crane 40, a Rail Mounted Gantry (RMG) crane 42, a side loader 44, a top loader 46, a straddle carrier 48, and/or a chassis rotator 49.

Figure 3B:
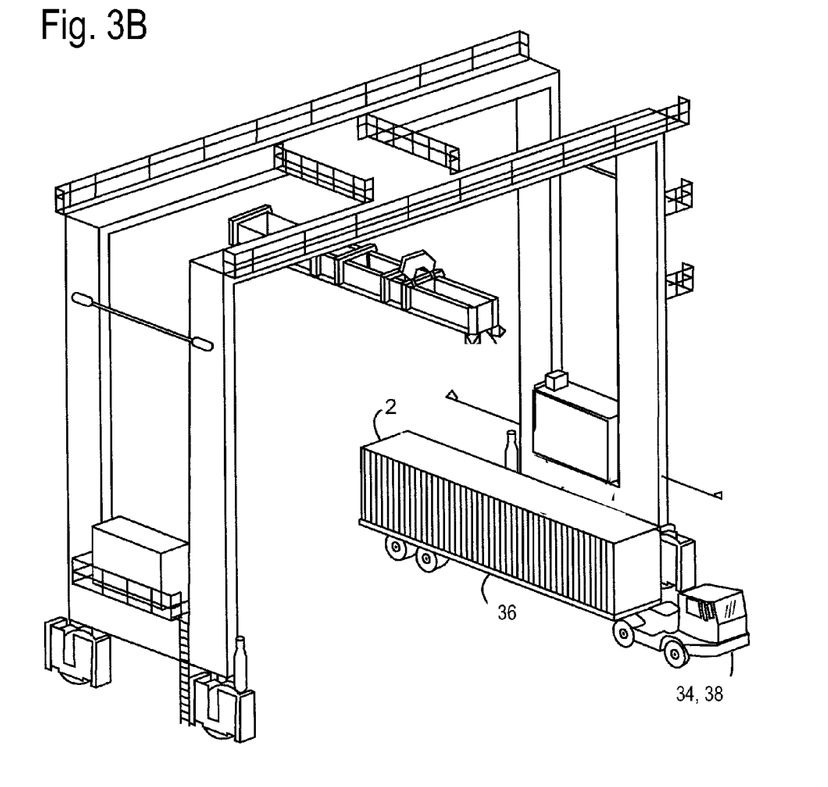

FIG. 3B shows some details of the RTG crane 40 and/or the RMG crane 42, with the UTR truck 34 and/or the drayman truck 38 coupled to a bomb cart 36 holding the container 2.

Figure 3C:
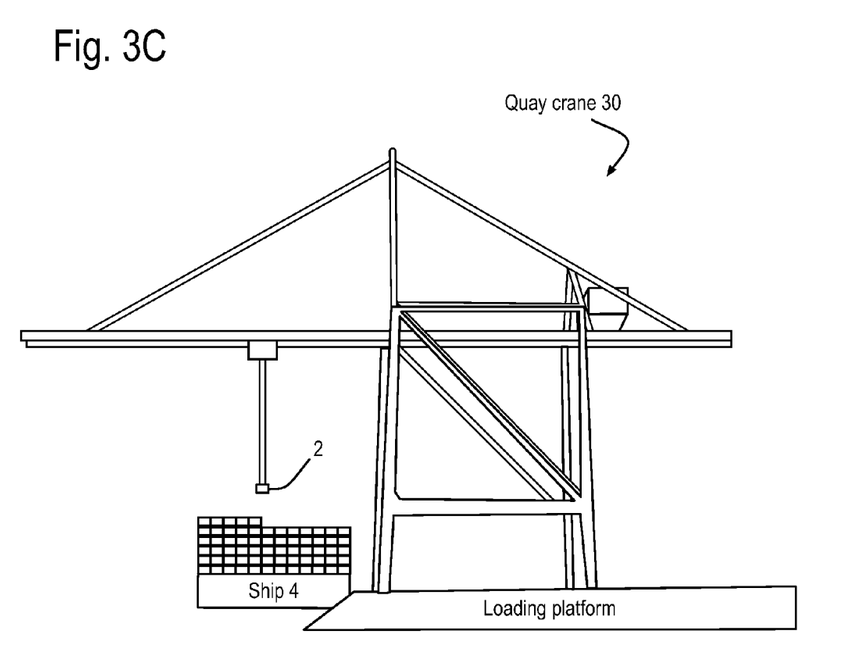

FIG. 3C shows the quay crane 30 transferring the container 2 from the ship 4.

Figure 3D:
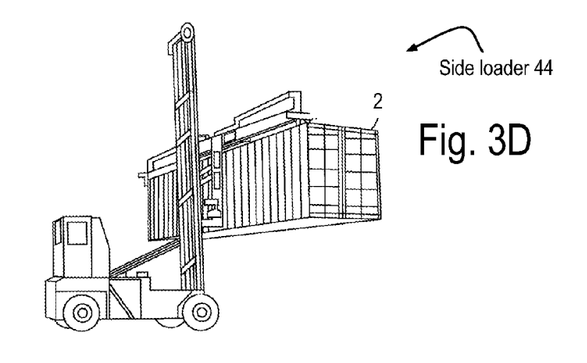

FIG. 3D shows the top loader 46 transferring the container 2.

Figure 3E:
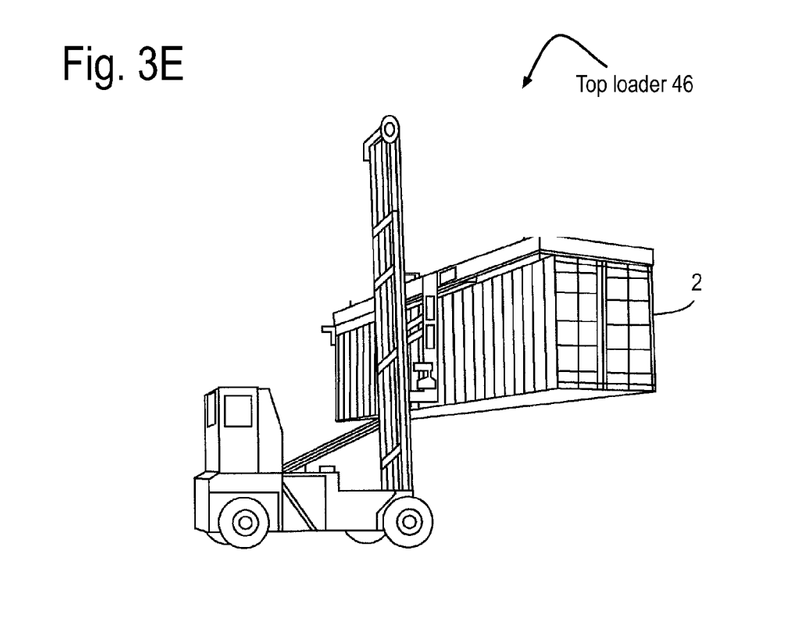

FIG. 3E shows the side loader 44 transferring the container 2.

Figure 3F:
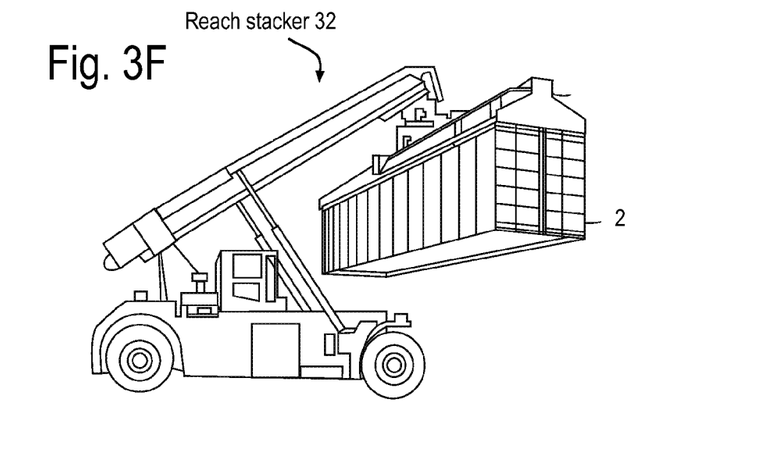

FIG. 3F shows the reach stacker 32 transferring the container 2.

Figure 3G:
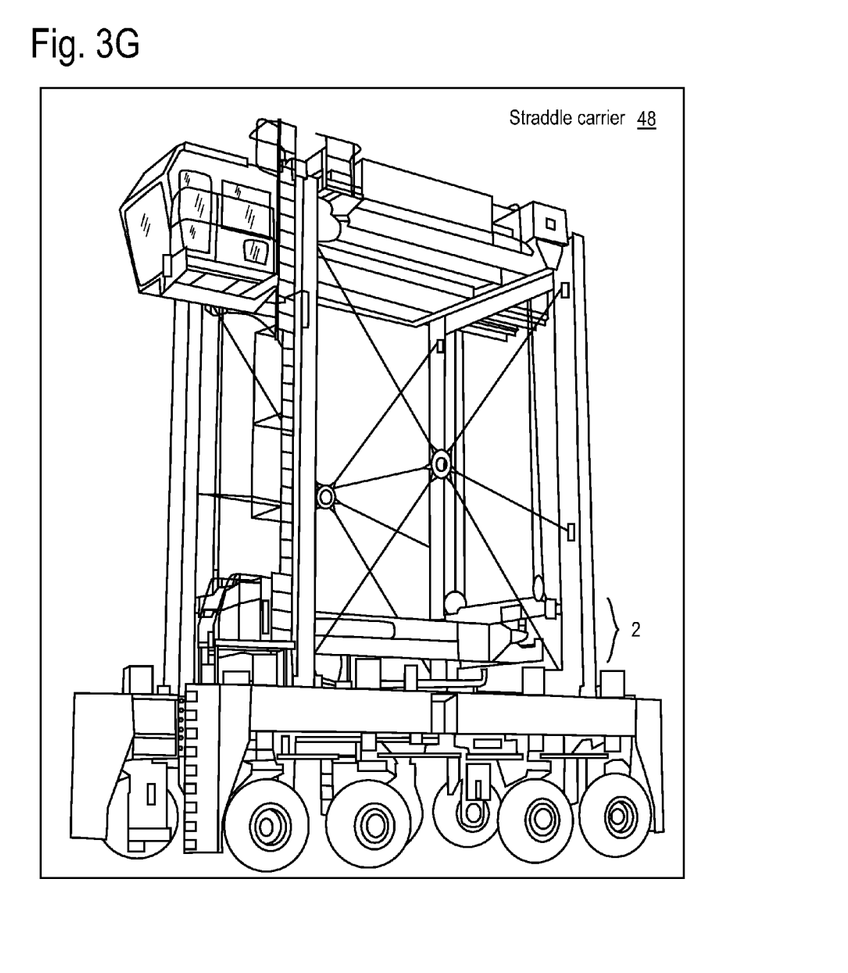

FIG. 3G shows the straddle carrier 48 transferring the container 2.

In some embodiments, the processor 100 may create both the system action request 150 and the system log 130 in response to the received status report 120.

Figure 4:
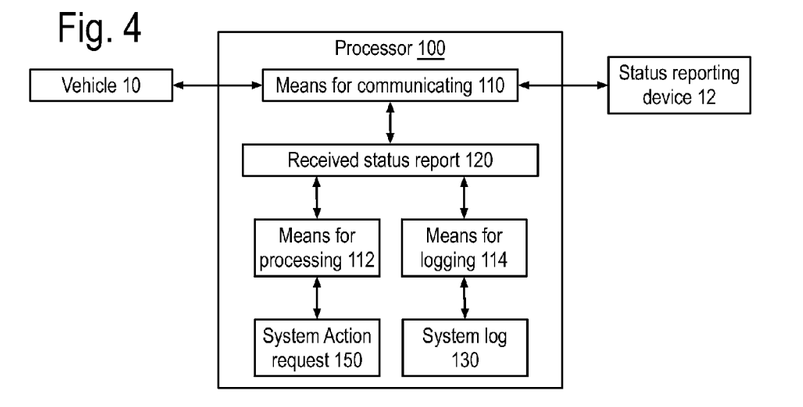
FIG. 4 shows the processor may include means for communicating to create the received status report, means for processing the received status report to create the system action request, and means for logging the received status report to maintain at least one system log for the vehicle and/or the status reporting device.
Figure 5:
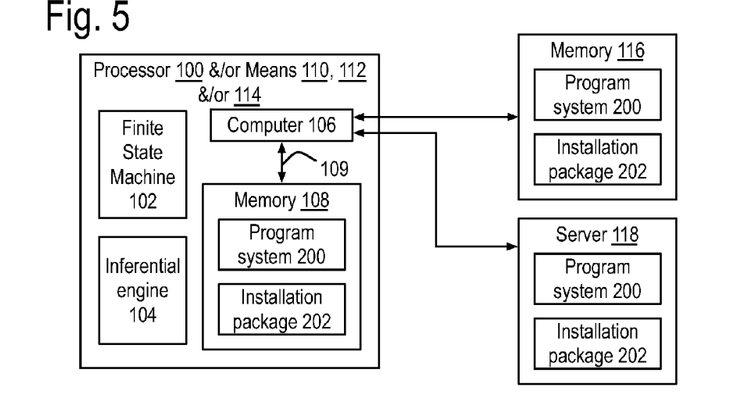
FIG. 5 shows the processor and/or some or all of these means of FIG. 4 may include at least one instance of a finite state machine, an inferential engine, and/or a computer accessibly coupled to a memory that may include a program system configured to instruct the computer. Also shown are a computer readable memory and/or a server, both configured to communicate with the computer.

FIG. 4 shows the processor 100 may include means for communicating 110 to create the received status report 120 for the vehicle 10 and/or the status reporting device 12, means for processing 112 the received status report to create the system action request, and means for logging 114 the received status report to maintain at least one system log for at least one of the vehicle and the status reporting device FIG. 5 shows the processor 100 and/or some or all of these means 110, 112 and/or 114 may include at least one instance of a finite state machine 102, an inferential engine 104, and/or a computer 106 accessibly coupled 109 to a memory 108 that may include a program system configured to instruct the computer. Also shown are a computer readable memory 116 and/or a server 118, both configured to communicate with the computer. The computer readable memory may include the program system and/or an installation package 202 configured to instruct the computer to install the program system. The server may be configured to deliver the program system and/or the installation package to the computer.

The finite state machine 102 may receive at least one input, maintains-updates at least one state and generates at least one output based upon a value of at least one of said input and said state.

The computer 106 may include at least one data processor and at least one instruction processor with each of said data processors instructed by at least one of said instruction processors.

The inferential engine 104 may maintain at least one inferential rule and may infer from said inferential rule at least one fact.

The installation package 202 may be implemented in a compressed format and/or in a form of source code that may be compiled and/or interpreted to instruct the computer 106 to install the program system 200.

Figure 6:
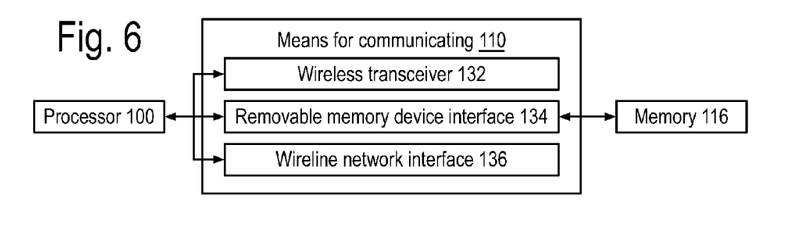
FIG. 6 shows that the processor may be configured to communicate with, and/or at least the means for communication may include, at least one instance of a wireless transceiver, possibly embedded in a cellular card or possibly interfacing to a WIFI network, and/or a removable memory device interface, and/or a wireline network interface. Any of these means for communicating may implement a means for sending the status report possibly as packets of the wireline network interface, as frames of the WIFI network and/or as an email. Also, the removable memory device interface may be configured to communicate with a removable memory device that may include one or more instances of the computer readable memory of FIG. 5.

FIG. 6 shows that the processor 100 may be configured to communicate with, and/or at least the means for communication 110 may include, at least one instance of a wireless transceiver 132, and/or a removable memory device interface 134, and/or a wireline network interface 136. Also, the removable memory device interface may be configured to communicate with a removable memory device that may include one or more instances of the computer readable memory 116 of FIG. 5.

There will some further discussion of the interfaces of FIG. 6 shortly, but first the program system 200 of FIG. 5 will be discussed.

Figure 7:
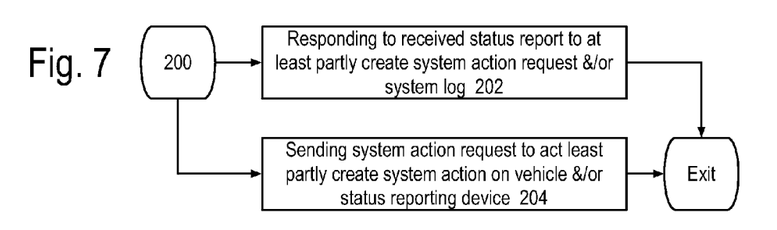
FIGS. 7 to 9 show flowcharts of some details of the program system instructing the processor.
Figure 8:
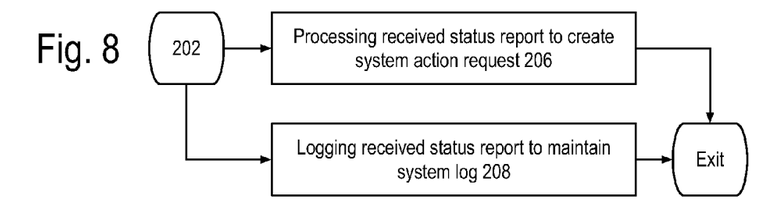
Figure 9:
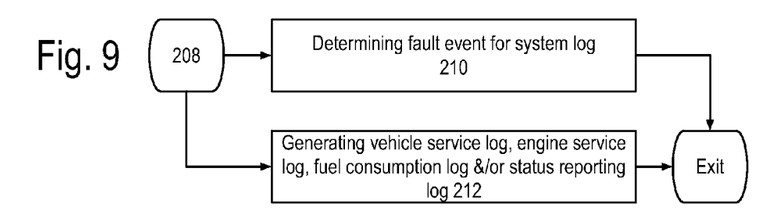

FIGS. 7 to 9 show flowcharts of some details of the program system 200 instructing the processor 100. These flowcharts may show some method embodiments, which may include arrows signifying a flow of control and/or state transitions as well as sometimes position data, supporting various implementations. These may include a program operation, or program thread, executing upon the computer 106 or states of the finite state machine 102. Each of these program steps may at least partly support the operation to be performed. The operation of starting a flowchart refers to entering a subroutine or a macroinstruction sequence in the computer or of a possibly initial state or condition of the finite state machine. The operation of termination in a flowchart refers to completion of those operations, which may result in a subroutine return in the computer or possibly return the finite state machine to a previous condition or state. A rounded box with the word "Exit" in it denotes the operation of terminating a flowchart.

FIG. 7 shows a flowchart of some details of the program system 200 of FIG. 5, including at least one of the following: Program step 202 supports responding to said received status report 120 to at least partly create at least one of said system action request 150 and said system log 130. Program step 204 supports sending said system action request to at least partly create a system action 156 on the vehicle 10 and/or said status reporting device 12.

FIG. 8 shows some details of program step 202 responding to the received status report 120 by including at least one of the following. Program step 206 supports processing 112 said received status report to create said system action request 150. Program step 208 supports logging 114 said received status report to maintain said system log 130.

FIG. 9 shows some details of the program step 208 logging the received status report by including at least one of the following.

Figure 10:
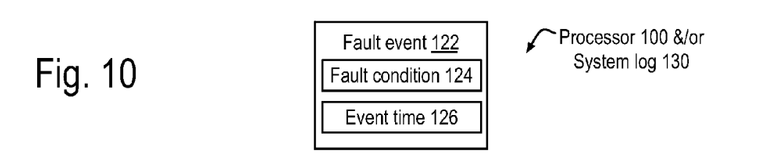
FIGS. 10 to 12 shows some details of the system log.

Program step 210 supports determining a fault event 122 for the system log 130. The fault event may include, as shown in FIG. 10, a fault condition 124 and an event time 126, all of which may be included in the processor 100 and/or the system log 130.

Figure 11:
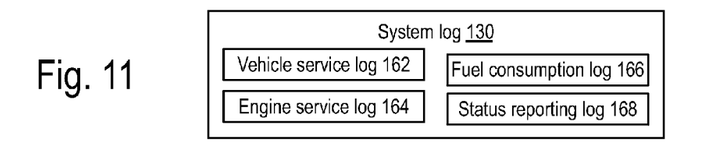

Program step 212 supports generating for said vehicle 10 a vehicle service log 162, and/or an engine service log 164, and/or a fuel consumption log 166, and/or a status reporting log 168, any or all of which may be included in the system log 130 as shown in FIG. 11.

Figure 12:
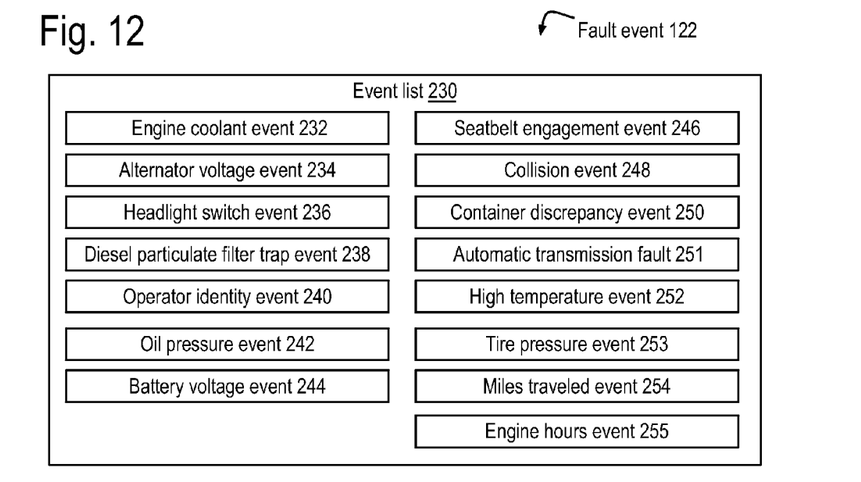

FIG. 12 shows some further details of the fault event 122, which may include at least one member of an event list 230 including an engine coolant event 232, an oil pressure event 242, an alternator voltage event 234, a battery voltage event 244, a headlight switch event 236, a seatbelt engagement event 246, a diesel particulate filter trap event 238, a collision event 248, an operator identity event 240, a container discrepancy event 250, an automatic transmission event 251, a high temperature event 252, a tire pressure event 253, a miles traveled event 254 and/or an engine hours event 255.

Figure 13:
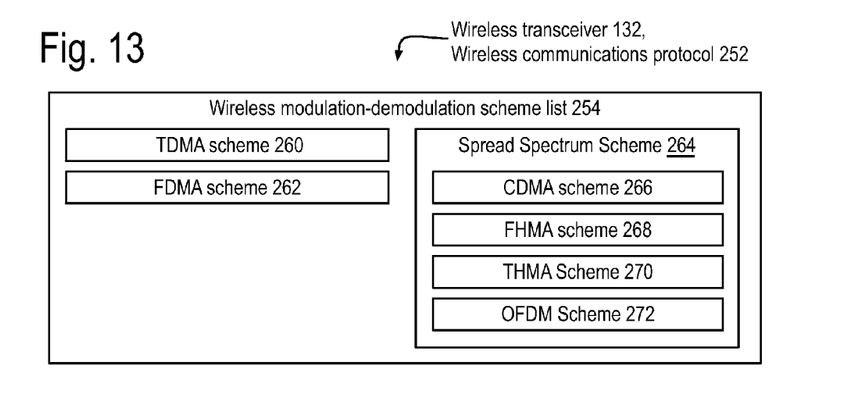
FIGS. 13 and 14 show some details of the communications of FIG. 6.

Returning now to cover some details of the communications that may be involved with FIG. 6. FIG. 13 will show some details for the wireless transceiver 132. And FIG. 14 will show some of the details of the wireline network interface 136.

FIG. 13 shows some details of the wireless transceiver 132 of FIG. 6, where the transceiver is compatible with a wireless communications protocol 252 that employs at least one member of the wireless modulation-demodulation scheme list 254 that includes a Time Division Multiple Access (TDMA) scheme 260, a Frequency Division Multiple Access (FDMA) scheme 262, and/or a Spread Spectrum Scheme 264. The spread spectrum scheme may include variations on at least one of a Code Division Multiple Access (CDMA) scheme 266, a Frequency Hopping Multiple Access (FHMA) scheme 268, a Time Hopping Multiple Access (THMA) scheme 270 and/or an Orthogonal Frequency Division Multiple (OFDM) access scheme 272.

Figure 14:
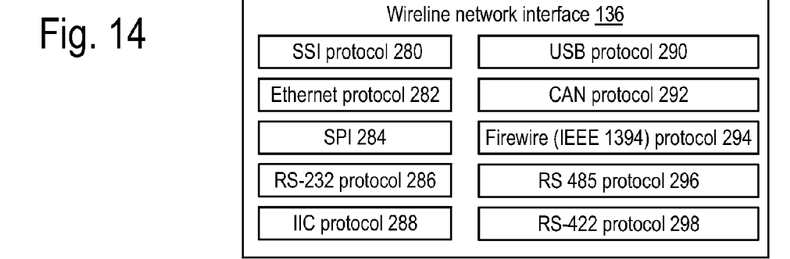

FIG. 14 shows that the wireline network interface 136 may be compatible with at least one version of at least one of a Synchronous Serial Interface (SSI) protocol 280, an Ethernet protocol 282, a Serial Peripheral Interface (SPI) 284, an RS-232 protocol 286, an Inter-IC (IIC) protocol 288, a Universal Serial Bus (USB) protocol 290, a Controller Area Network (CAN) Bus protocol 292, a Firewire protocol that may be considered a version of the Institute for Electrical and Electronic Engineers (IEEE) 1394 communications protocol 294, an RS-485 protocol 296, and/or an RS-422 protocol 298.

FIGS. 15 through 19 will show some details of the received status report 120.

Figure 15:
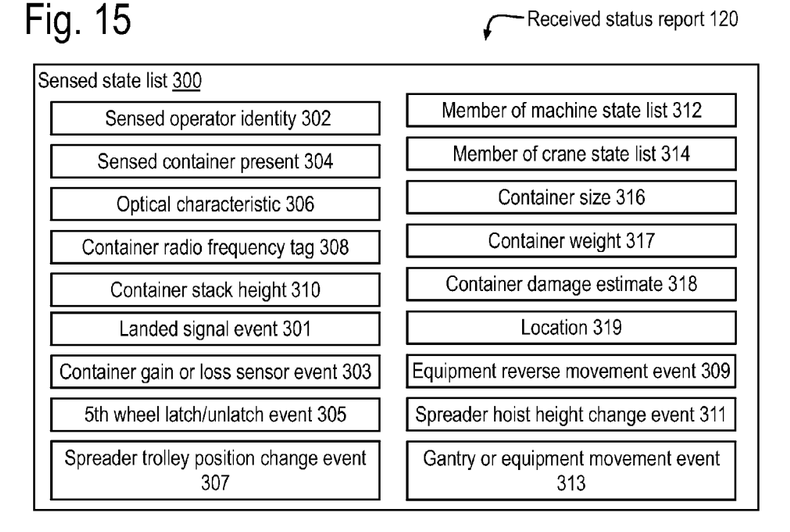
FIGS. 15 through 19 show some details of the received status report.

FIG. 15 shows that the received status report 120 may include at least one instance of at least one member of a sensed state list 300 including a sensed operator identity 302, a sensed container present 304, an optical characteristic 306 of the container 2, a container radio frequency tag 308, a container stack height 310, a member of a machine state list 312, a member of a crane state list 314, a container size 316, a container weight 317, a container damage estimate 318, and a location 319 of the vehicle 10 and/or the container 2 coupled to said vehicle. The sensed status list may also include a landed signal event 301, a container gain or loss sensor event 303, a fifth wheel latch/unlatch event 305, a spreader trolley position change event 307, a spreader hoist height position change event 309, an equipment reverse movement event 311, and/or a gantry or equipment movement event 313.

Figure 16:
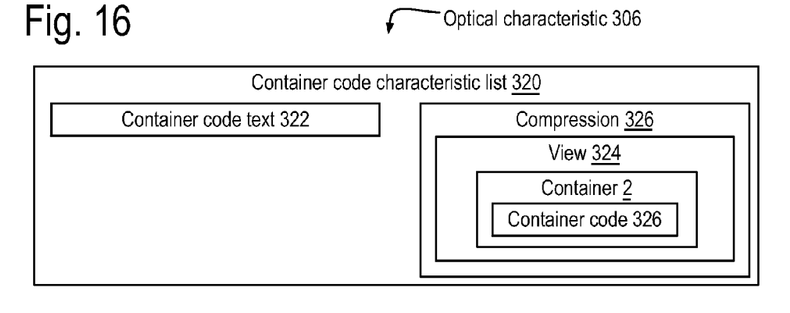

FIG. 16 shows that the optical characteristic 306 of the container 2 may include at least on instance of at least one member of the container code characteristic list 320 including a container code text 322, a view 324 of a container code 3 on the container, and/or a compression 326 of the view of the container code. The view 324 may include a focal length referenced image whereby the image may be accessed based upon a focal length related parameter to reveal details in the foreground mid-ground and/or background of the view 324 of the container 2 and/or its container code 326.

Figure 17:
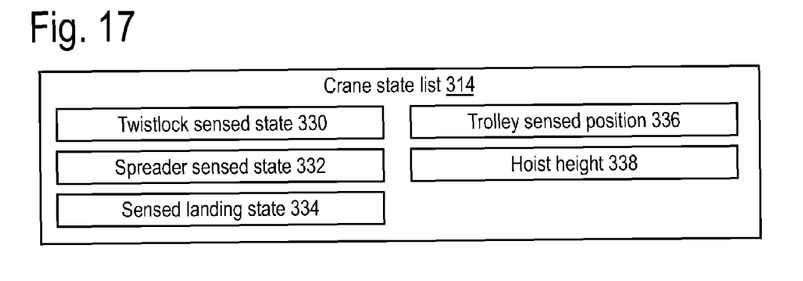

FIG. 17 shows the crane state list 314 may include the members of a twistlock sensed state 330, a spreader sensed state 332, a sensed landing state 334, a trolley sensed position 336, and a hoist height 338.

Figure 18:
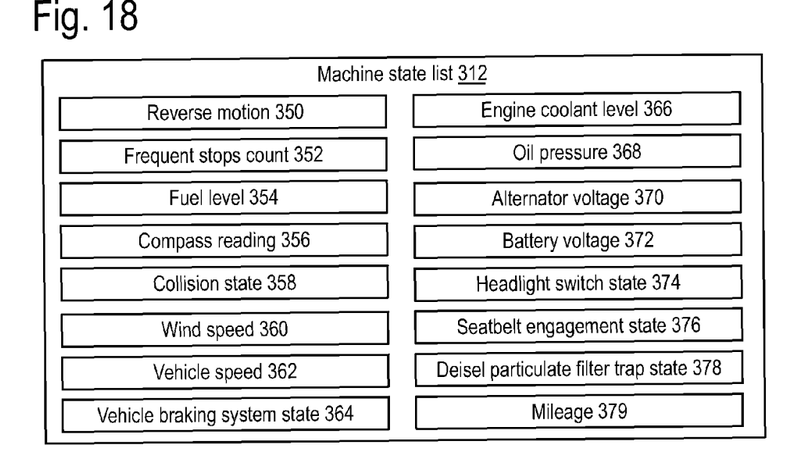

FIG. 18 shows some details of the members of the machine state list 312 of FIG. 15, which may include a reverse motion 350, a frequent stops count 352, a fuel level 354, a compass reading 356, a collision state 358, a wind speed 360, a vehicle speed 362, a vehicle braking system state 364, an engine coolant level 366, an oil pressure 368, an alternator voltage 370, a battery voltage 372, a headlight switch state 374, a seatbelt engagement state 376, a diesel particulate filter trap state 378 and a mileage 379

Figure 19:
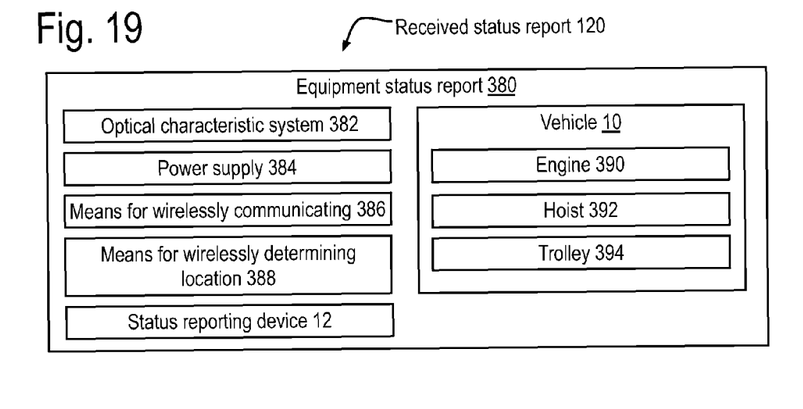

FIG. 19 shows that the received status report 120 may include at least one equipment status report 380 for at least one of the following: an optical characteristic system 382 that may generate the optical characteristic 306 of FIGS. 15 and 16, a power supply 384 that may work with the vehicle 10 and/or the status reporting device 12, a means 386 for wirelessly communicating that may be included in the status reporting device, a means 388 for wirelessly determining location that may be used with the vehicle and/or the status reporting device, and at least the following components of the vehicle: an engine 390, a hoist 392 and a trolley 394.

The preceding embodiments have been provided by way of example and are not meant to constrain the scope of the following claims.

What is claimed is:

1. A system for monitoring a container-handling vehicle, comprising:
    a container management system, comprising:
        a computer;
        a computer-readable memory accessibly coupled to said computer;
        a system log accessibly coupled to said computer; and
        a wireless transceiver; and
        a status reporting device adapted for communication with said container management system and configured to monitor the container-handling vehicle, comprising a local status report,
    wherein said computer generates a received status report from said local status report, said received status report comprising:
        a container code;
        a container weight;
        a container location; and
        a status of said status reporting device.

2. The system of claim 1, wherein said received status report further comprises a container damage estimate.

3. The system of claim 1, where said received status report further comprises a container stack height.

4. The system of claim 1, wherein said received status report further comprises a vehicle location.

5. The system of claim 1, where said received status report further comprises a sensed operator identity.

6. The system of claim 1, wherein said received status report further comprises a twistlock sensed state.

7. The system of claim 1, wherein said received status report further comprises a gantry movement event.

8. The system of claim 1, wherein said received status report further comprises a fifth wheel latch/unlatch event.

9. The system of claim 1, where said received status report further comprises a spreader hoist height change event.

10. The system of claim 1, wherein said received status report further comprises a frequent stops count.

11. The system of claim 1, wherein said received status report further comprises a diesel particulate filter trap state.

12. The system of claim 1, wherein said received status report further comprises a tire pressure event.

13. The system of claim 1, wherein said received status report further comprises a collision event.

14. The system of claim 1, wherein said received status report further comprises an operator identity fault event.

15. The system of claim 1, wherein said received status report further comprises an equipment reverse movement event.

16. The system of claim 1, wherein said received status report further comprises an engine coolant event.

17. The system of claim 1, wherein said received status report further comprises a sensed landing state.

18. The system of claim 1, wherein said computer generates a system action request from said received status report.

19. The system of claim 18, wherein said system action request comprises a fault condition problem report.

20. The system of claim 18, wherein said system action request comprises a maintenance schedule request.

* * * * *